(12) United States Patent
Kimura et al.

(10) Patent No.: US 8,981,041 B2
(45) Date of Patent: Mar. 17, 2015

(54) PRODUCTION PROCESS OF POLY(ARYLENE SULFIDE) AND PRODUCTION APPARATUS THEREOF

(75) Inventors: Takayuki Kimura, Tokyo (JP); Tomoyoshi Koizumi, Tokyo (JP); Mitsuhiro Matsuzaki, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 13/809,505

(22) PCT Filed: Jul. 6, 2011

(86) PCT No.: PCT/JP2011/065461
§ 371 (c)(1),
(2), (4) Date: Jan. 10, 2013

(87) PCT Pub. No.: WO2012/008340
PCT Pub. Date: Jan. 19, 2012

(65) Prior Publication Data
US 2013/0116401 A1    May 9, 2013

(30) Foreign Application Priority Data
Jul. 13, 2010   (JP) ................. 2010-159163

(51) Int. Cl.
*C08G 75/14*  (2006.01)
*C08G 75/02*  (2006.01)
(52) U.S. Cl.
CPC ............. *C08G 75/14* (2013.01); *C08G 75/0259* (2013.01); *C08G 75/0281* (2013.01)
USPC ........... 528/387; 528/388; 528/389; 525/537; 422/267; 422/186.1; 422/513; 422/422
(58) Field of Classification Search
CPC ................................................... C08G 75/025
USPC ........... 525/537; 528/387, 388, 389; 422/267, 422/186.1, 513, 422
See application file for complete search history.

(56) References Cited

U.S. PATENT DOCUMENTS 5,143,554 A    9/1992  Koyama et al.
6,361,701 B1 *  3/2002  Schade .......................... 210/786
(Continued)

FOREIGN PATENT DOCUMENTS

CN    1732209 A    2/2006
EP    0594189 A    4/1994
(Continued)

OTHER PUBLICATIONS

Totoku filter catalog, 1992.*
(Continued)

*Primary Examiner* — Shane Fang
(74) *Attorney, Agent, or Firm* — Porter Wright Morris & Arthur LLP (57) ABSTRACT

A production process of a poly(arylene sulfide) (PAS), including a polymerization step of forming a PAS from a sulfur source that is an alkali metal (hydro)sulfides and a dihalo-aromatic compound in an organic amide solvent; a separation step of PAS particles; a countercurrent washing step that is a step of washing the PAS particles with water and/or an organic solvent, wherein a downward current of a PAS particle-containing aqueous slurry is continuously brought into countercurrent contact with an upward current of a washing liquid; a PAS particle re-separation step of capturing a washing waste liquid by a PAS particle re-separating unit, in which a micro-slit filter has been installed, and then re-separating the PAS particles from the micro-slit filter, preferably using a backwashing unit, to discharge them; and a collecting step of the PAS particles discharged, and a production apparatus of a poly(arylene sulfide).

16 Claims, 1 Drawing Sheet

(56) References Cited

U.S. PATENT DOCUMENTS

| | | |
|---|---|---|
| 2003/0150804 A1 | 8/2003 | Haubs |
| 2005/0087215 A1 | 4/2005 | Miyahara et al. |
| 2006/0086374 A1 | 4/2006 | Sato et al. |
| 2008/0025143 A1 | 1/2008 | Ohashi et al. |
| 2008/0097075 A1 | 4/2008 | Matsuzaki et al. |
| 2009/0078644 A1* | 3/2009 | Mues et al. ............ 210/601 |
| 2011/0124825 A1* | 5/2011 | Konno et al. ............ 525/537 |

FOREIGN PATENT DOCUMENTS

| | | |
|---|---|---|
| JP | 3-086287 A | 4/1991 |
| JP | 6-192423 A | 7/1994 |
| JP | 2003-516846 A | 5/2003 |
| JP | 2008-513186 A | 5/2008 |
| JP | 2008-274294 A | 11/2008 |
| WO | 03/048231 A1 | 6/2003 |
| WO | 2006/027985 A | 3/2006 |

OTHER PUBLICATIONS

Prenen, Ph.D. dissertation, Polymeric microflters by interference holography:Development and applications, 2009.*

The First Official Action and Search Report from the corresponding CN 201180033612.5 dated Dec. 2, 2013.

* cited by examiner

PRODUCTION PROCESS OF POLY(ARYLENE SULFIDE) AND PRODUCTION APPARATUS THEREOF

TECHNICAL FIELD

The present invention relates to a production process of a poly(arylene sulfide) comprising a polymerization step, a separation step, a washing step and a collecting step, in which particular countercurrent washing step and re-separation step of particles are arranged, whereby a high-quality poly(arylene sulfide) can be stably produced, and a yield of a product can be improved, and a burden of a washing waste liquid on an environment can be reduced, and a production apparatus used in this production process.

BACKGROUND ART

Poly(arylene sulfides) (hereinafter may also be abbreviated as "PASs") represented by poly(phenylene sulfide) (hereinafter may also be abbreviated as "PPS") are engineering plastics excellent in heat resistance, chemical resistance, flame retardancy, mechanical strength, electrical properties, dimensional stability, etc. The PASs are commonly used in a wide variety of technical fields such as electrical equipments, electronic equipments, automotive equipments and packaging materials because they can be molded or formed into various kinds of molded or formed products, films, sheets, fibers, etc. by general melt processing processes such as extrusion, injection molding and compression molding.

As a typical production process of a PAS, is known a process in which a sulfur source is reacted with a dihalo-aromatic compound (hereinafter may also be abbreviated as "DHA") such as p-dichlorobenzene (hereinafter may also be abbreviated as "pDCB") under heating conditions in an organic amide solvent such as N-methyl-2-pyrrolidone (hereinafter may also be abbreviated as "NMP"). As the sulfur source, is generally used an alkali metal sulfide, an alkali metal hydrosulfide or a mixture thereof. When the alkali metal hydrosulfide is used as the sulfur source, the alkali metal hydrosulfide is used in combination with an alkali metal hydroxide.

The polymerization reaction of the sulfur source with the dihalo-aromatic compound is a desalting polycondensation reaction, and so a great amount of a salt (i.e., an alkali metal halide) such as NaCl is produced after the reaction. In addition, hydrogen sulfide is formed or secondarily produced because of the reaction of the sulfur-containing compound. Therefore, after a PAS formed by the polymerization reaction has been separated and collected from the reaction mixture, the polymer collected has heretofore been washed with a washing liquid such as water, an organic solvent or a mixture of water and an organic solvent to remove the salt such as NaCl and hydrogen sulfide together with the organic amide solvent.

A washing method is roughly divided into batch washing and continuous washing.

The batch washing is a method of washing the polymer collected under stirring with a washing liquid at a time or in portions for a predetermined period of time in a washing vessel and a method of generally conducting this process several times repeatedly. For example, Patent Literature 1 (Japanese Patent Application Laid-Open No. 6-192423; corresponding to EP Patent Application Laid-Open No. 0594189) has proposed a method of washing the PAS in a washing container and a washing tank. However, one or more washing vessels are required, and so the equipments are complicated, a construction cost is expensive, and increases in the amount of a washing liquid consumed, the amount of a waste liquid treated and stirring power are incurred, whereby increase in a running cost has not been avoided.

On the other hand, there has been proposed, as the continuous washing, a method of bringing a polymer in a wet state into countercurrent contact with an organic solvent or water that is a washing liquid. For example, Patent Literature 2 (International Publication No. 2003/048231; corresponding to US Patent Application Laid-Open No. 2005/0087215) has proposed bringing a polymer slurry containing a polymer into countercurrent contact with a washing liquid by means of a substantially V-shaped pipe device equipped with a downward pipe portion and an upward pipe portion, Patent Literature 3 (Japanese Patent Application Laid-Open No. 3-86287; corresponding to U.S. Pat. No. 5,143,554) has proposed bringing a granular resin of PPS or the like into countercurrent contact with a washing liquid in a pipe body perpendicular provided and having static mixing elements continuously arranged in series. In addition, Patent Literature 4 (Japanese Patent Application Laid-Open No. 2003-516846 through PCT route; corresponding to US Patent Application Laid-Open No. 2003/0150804) has proposed bringing a first liquid phase containing a PAS into countercurrent contact with a second liquid phase such as water while precipitating the PAS under gravity to transfer the PAS to the second liquid phase. Further, Patent Literature 5 (Japanese Patent Application Laid-Open No. 2008-513186 through PCT route; corresponding to US Patent Application Laid-Open No. 2008/0025143) has proposed using a vertical type solid-liquid contact device equipped with a plurality of stirring chambers as a washing device for PAS resin particles and discloses that a downward current of a PAS-containing slurry is brought into countercurrent contact with an upward current of a washing liquid such as water.

Furthermore, it has also heretofore been known to conduct continuous washing repeatedly and conduct batch washing and continuous washing in combination prior to continuous washing.

The continuous washing by bringing the polymer in the wet state into countercurrent contact with the organic solvent or water that is the washing liquid has merits that washing efficiency is high, the equipments are simple, and a running cost is cheap. In particular, the method of bringing the downward current of the PAS particle-containing aqueous slurry into countercurrent contact with the upward current of the washing liquid to discharge the PAS washed and the washing waste liquid from a lower portion and an upper portion of the washing device, respectively, is more efficient because the PAS particles higher in specific gravity than water naturally fall in the washing liquid by virtue of gravity, and the equipments are also simpler. In addition, according to this method, the amount of the PAS particle-containing aqueous slurry supplied and the amount of the washing liquid supplied are controlled, whereby a washing speed can be easily controlled.

The PAS is naturally higher in specific gravity than the washing liquid. However, the precipitation of the PAS particles may be prevented in some cases according to the compositions of the aqueous slurry containing the PAS particles and washing liquid, temperature conditions, etc. In particular, PAS particles relatively small in particle size are hard to be precipitated and may rise toward the level of the washing liquid in some cases. The PAS particles risen in the vicinity of the level of the washing liquid may flow out of a countercurrent washing device in attendance upon the discharge of the washing waste liquid in some cases. In addition, the particle size and particle size distribution of the PAS particles flowed out of the countercurrent washing device in attendance upon the discharge of the washing waste liquid, and the amount of the particles flowed out cannot be surely expected. These PAS particles flowed out partly include those hard to be used in use of PAS products, such as PAS markedly small in particle size. However, many particles thereof may be used in use of products if they are collected. Accordingly, in case that PAS particles flow out of the countercurrent washing device in attendance upon the discharge of the washing waste liquid, their particle sizes and particle size distributions may be different between product lots in some cases, a yield of the PAS product is lowered, and a treatment for cleaning the washing waste liquid is troubled, so that a high-quality PAS cannot be stably produced. Thus, improvement thereof has been required. If the washing waste liquid is filtered through a filter having an extremely small pore size, it goes without saying that the flowing-out of the PAS particles can be prevented. However, the following problems have been unable to be avoided. 1) A high cost is required to re-separate the PAS particles. 2) The filter is clogged if the operation is conducted for a long period of time. 3) Since fine PAS particles are also re-separated, the whole quality of PAS is hard to be maintained and managed to specifications.

In addition, the PAS particles re-separated by filtering the washing waste liquid are markedly contaminated by mixing-in of foreign matters such as metal particles and pieces of a filter medium that is considered to be caused by a separating device including the filter, and so a person skilled in the art has not assumed such particles to be collected as a product.

CITATION LIST

Patent Literature

Patent Literature 1: Japanese Patent Application Laid-Open No. 6-192423
Patent Literature 2: International Publication No. 2003/048231
Patent Literature 3: Japanese Patent Application Laid-Open No. 3-86287
Patent Literature 4: Japanese Patent Application Laid-Open No. 2003-516846 through PCT route
Patent Literature 5: Japanese Patent Application Laid-Open No. 2008-513186 through PCT route

SUMMARY OF INVENTION

Technical Problem

It is an object of the present invention to provide a production process of a PAS, by which PAS particles discharged in attendance upon the discharge of a washing liquid in a countercurrent washing of PAS particles can be surely re-separated and collected as a product, thereby efficiently producing a high-quality PAS at a high yield for a long period of time, and a cost required to clean a washing waste liquid can be reduced, and a production apparatus of the PAS, which is suitable for use in this process.

Solution to Problem

The present inventors have carried out an extensive investigation with a view toward achieving the above object. As a result, it has been found that in a countercurrent washing method and a countercurrent washing device of PAS particles, a process, in which PAS particles discharged in attendance upon the discharge of a washing liquid are captured by means of a micro-slit filter, and the PAS particles are re-separated from the micro-slit filter by backwashing or the like and discharged and collected, is repeated, whereby high-quality PAS particles can be efficiently provided at a high yield for a long period of time.

According to the present invention, there is thus provided a production process of a PAS, comprising a polymerization step of subjecting at least one sulfur source selected from the group consisting of alkali metal sulfides and alkali metal hydrosulfides and a dihalo-aromatic compound to a polymerization reaction in an organic amide solvent to form a PAS; a separation step of separating PAS particles from a reaction mixture containing the PAS formed; a countercurrent washing step that is a step of washing the PAS particles separated with at least one washing liquid selected from the group consisting of water, an organic solvent and a mixed solution of water and an organic solvent, wherein a PAS particle-containing aqueous slurry is caused to proceed downward in a washing vessel, the washing liquid is caused to proceed upward to continuously bring the washing liquid into countercurrent contact with the aqueous slurry, thereby conducting countercurrent washing, the PAS particles are discharged from a lower portion of the washing vessel, and a washing waste liquid is discharged from an upper portion of the washing vessel; a PAS particle re-separation step of supplying the washing waste liquid discharged from the washing vessel to a PAS particle re-separating unit, in which a micro-slit filter has been installed, to capture PAS particles and then re-separating the PAS particles from the micro-slit filter to discharge them; and a collecting step of collecting the PAS particles discharged.

According to the present invention, there are also provided the following embodiments.

(1) The above-described production process of the PAS, wherein the countercurrent washing step and the PAS particle re-separation step are conducted plural times.
(2) The above-described production process of the PAS, wherein the washing vessel is a washing tower.
(3) The above-described production process of the PAS, wherein the PAS particle-containing aqueous slurry contains an acidic compound.
(4) The above-described production process of the PAS, wherein the polymerization step is a step of subjecting at least one sulfur source selected from the group consisting of the alkali metal sulfides and the alkali metal hydrosulfides and the dihalo-aromatic compound to a polymerization reaction at a temperature of 170 to 290° C. in the presence of a phase separation agent in the organic amide solvent.
(5) The above-described production process of the PAS, wherein the polymerization step is a step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent, causing the phase separation agent to exist in a polymerization reaction system at the time a conversion of the dihalo-aromatic compound has reached at least 30% and continuing the polymerization reaction at a temperature of 245 to 290° C.
(6) The above-described production process of the PAS, wherein the polymerization step is at least two-stage polymerization steps comprising a first-stage polymerization step of subjecting at least one sulfur source selected from the group consisting of the alkali metal sulfides and the alkali metal hydrosulfides and the dihalo-aromatic compound to a polymerization reaction in the organic amide solvent to form a polymer in which a conversion of the dihalo-aromatic compound is 80 to 99%; and a second-stage polymerization step of continuing the polymerization reaction in the presence of the phase separation agent in a phase-separated state that a concentrated formed polymer phase and a dilute formed polymer phase are present in a mixed state within the polymerization reaction system.

(7) The above-described production process of the PAS, wherein the polymerization step is at least two-stage polymerization steps comprising a first-stage polymerization step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent in a state that water is present in a proportion of 0.02 to 2.0 mol per mol of a charged sulfur source, thereby forming a polymer in which a conversion of the dihalo-aromatic compound is 80 to 99%; and a second-stage polymerization step of controlling the amount of water in the polymerization reaction system so as to bring about a state that water exists in a proportion of from higher than 2.0 mol to not higher than 10 mol per mol of the charged sulfur source, and continuing the polymerization reaction at a temperature of 245 to 290° C. in a phase-separated state that a concentrated formed polymer phase and a dilute formed polymer phase are present in a mixed state within the polymerization reaction system.

(8) The above-described production process of the PAS, wherein in the second-stage polymerization step, the amount of water in the polymerization reaction system is controlled so as to bring about a state that water exists in a proportion of from higher than 2.0 mol to not higher than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of 0.01 to 3 mol per mol of the charged sulfur source.

(9) The above-described production process of the PAS, wherein prior to the polymerization step, are arranged a dehydration step of heating and reacting a mixture containing the organic amide solvent, the sulfur source containing the alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system; and a charging step of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of the charged sulfur source, and the number of moles of water becomes 0.02 to 2.0 mol per mol of the charged sulfur source.

(10) The above-described production process of the PAS, wherein the phase separation agent is added prior to the separation step.

(11) The above-described production process of the PAS, wherein the phase separation agent is at least one selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons.

(12) The above-described production process of the PAS, wherein the phase separation agent is composed of water and the organic carboxylic acid metal salt in proportions of 0.5 to 10 mol and 0.001 to 0.7 mol, respectively, per mol of the charged sulfur source.

According to the present invention, there is also provided a production apparatus of a PAS, comprising a polymerization device for subjecting at least one sulfur source selected from the group consisting of alkali metal sulfides and alkali metal hydrosulfides and a dihalo-aromatic compound to a polymerization reaction in an organic amide solvent to form a PAS; a separation device for separating PAS particles from a reaction mixture containing the PAS formed; a countercurrent washing device that is a washing device for washing the PAS particles separated with at least one washing liquid selected from the group consisting of water, an organic solvent and a mixed solution of water and an organic solvent, wherein a PAS particle-containing aqueous slurry is caused to proceed downward in a washing vessel, the washing liquid is caused to proceed upward to continuously bring the washing liquid into countercurrent contact with the aqueous slurry, thereby conducting countercurrent washing, the PAS particles are discharged from a lower portion of the washing vessel, and a washing waste liquid is discharged from an upper portion of the washing vessel; a PAS particle re-separating device having a PAS particle capturing unit equipped with a micro-slit filter, to which the washing waste liquid discharged from the washing vessel is supplied to capture PAS particles, and a backwashing unit for re-separating the PAS particles from the micro-slit filter to discharge them; and a collecting device for collecting the PAS particles discharged.

According to the present invention, there are also provided the following embodiments as the production apparatus of the PAS.

(1) The above-described production apparatus of the PAS, wherein the countercurrent washing device and the PAS particle re-separating device are respectively provided more than one device.

(2) The above-described production apparatus of the PAS, wherein the washing vessel is a washing tower.

Advantageous Effects of Invention

Since the present invention is directed to the production process of the PAS, comprising the polymerization step, the separation step, the countercurrent washing step, the PAS particle re-separation step and the collecting step, the invention exhibits effects that almost all PAS particles discharged in attendance upon the discharge of the washing liquid can be re-separated and collected, and a high-quality PAS can be efficiently produced at a high yield for a long period of time.

Since the present invention is also directed to the production apparatus of the PAS, comprising the polymerization device, the separation device, the countercurrent washing device, the PAS particle re-separating device and the collecting device, the invention exhibits effects that almost all PAS particles discharged in attendance upon the discharge of the washing liquid can be re-separated, and a high-quality PAS can be efficiently produced at a high yield for a long period of time.

As a result, the PAS obtained by the production process and production apparatus of the PAS according to the present invention is suitable for use in general melt processing processes such as extrusion, injection molding and compression molding and can be utilized in a wide variety of fields such as electrical and electronic equipments and automotive equipments, including sealing compounds and covering materials for electronic parts.

DESCRIPTION OF EMBODIMENTS

I. Polymerization Reaction Components
1. Sulfur Source

In the present invention, at least one sulfur source selected from the group consisting of alkali metal sulfides and alkali metal hydrosulfides is used as a sulfur source. As examples of the alkali metal sulfides, may be mentioned lithium sulfide, sodium sulfide, potassium sulfide, rubidium sulfide, cesium sulfide and mixtures of two or more compounds thereof. As examples of the alkali metal hydrosulfides, may be mentioned lithium hydrosulfide, sodium hydrosulfide, potassium hydrosulfide, rubidium hydrosulfide, cesium hydrosulfide and mixtures of two or more compounds thereof.

The alkali metal sulfide may be used in any form of an anhydride, a hydrate and an aqueous solution. Among these, sodium sulfide and lithium sulfide are preferred in that they are industrially available on the cheap. The alkali metal sulfide is preferably used as an aqueous mixture (i.e., a mixture with water having fluidity) such as an aqueous solution from the viewpoints of processing operation, metering, etc.

The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous solution or an aqueous mixture (i.e., a mixture with water having fluidity) from the viewpoints of processing operation, metering, etc.

The alkali metal sulfide used in the present invention may contain a small amount of an alkali metal hydrosulfide. In this case, the total molar quantity of the alkali metal sulfide and alkali metal hydrosulfide becomes a sulfur source, i.e., "a charged sulfur source", used in a polymerization reaction in a polymerization step after a dehydration step arranged as needed.

The alkali metal hydrosulfide used in the present invention may contain a small amount of an alkali metal sulfide. In this case, the total molar quantity of the alkali metal hydrosulfide and alkali metal sulfide becomes a charged sulfur source. When the alkali metal sulfide and the alkali metal hydrosulfide are mixed and used in combination, a mixture of both naturally becomes a charged sulfur source.

When the sulfur source contains the alkali metal hydrosulfide, an alkali metal hydroxide is used in combination. Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous solution or aqueous mixture.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide.

2. Dihalo-Aromatic Compound

The dihalo-aromatic compound (DHA) used in the present invention is a dihalogenated aromatic compound having 2 halogen atoms directly bonded to an aromatic ring. The halogen atom means each atom of fluorine, chlorine, bromine and iodine, and 2 halogen atoms in the same dihalo-aromatic compound may be the same or different from each other. These dihalo-aromatic compounds may be used either singly or in any combination thereof. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones. Among these, p-dihalobenzenes, m-dihalobenzenes and mixtures of these both compounds are preferred, p-dihalobenzenes are more preferred, and p-dichlorobenzene (pDCB) is particularly preferably used.

The charged amount of the dihalo-aromatic compound used in the polymerization reaction is generally 0.90 to 1.50 mol, preferably 1.00 to 1.10 mol, more preferably 1.00 to 1.09 mol, particularly preferably more than 1.00 mol, but not more than 1.09 mol per mol of the sulfur source (hereinafter referred to as "the charged sulfur source"; herein, the, alkali metal sulfide and/or the alkali metal hydrosulfide) that is present at the beginning of the polymerization reaction in the polymerization step, namely, in the charging step after a dehydration step arranged as needed and is used in the polymerization reaction in the polymerization step. When the charged amount of the dihalo-aromatic compound falls within a range of 1.01 to 1.09 mol, good results can be often yielded. If a molar ratio of the dihalo-aromatic compound charged to the sulfur source is too high, it is difficult to form a high-molecular weight polymer. If the molar ratio of the dihalo-aromatic compound charged to the sulfur source is too low on the other hand, a decomposition reaction is easy to occur, and it is difficult to stably perform a polymerization reaction.

3. Branching or Crosslinking Agent

In order to introduce a branched or crosslinked structure into a formed PAS, a polyhalo-compound (may not be always an aromatic compound), to which at least 3 halogen atoms are bonded, an active hydrogen-containing halogenated aromatic compound, a halogenated aromatic nitro compound or the like may also be used in combination. Preferable examples of the polyhalo-compound as a branching or crosslinking agent include trihalobenzenes. In order to form a terminal of a specific structure in a PAS formed or control the polymerization reaction or a molecular weight, a monohalo-compound may be used in combination. As the monohalo-compound, may be used not only a monohalo-aromatic compound, but also a monohalo-aliphatic compound.

4. Organic Amide Solvent

In the present invention, an organic amide solvent that is an aprotic polar organic solvent is used as a solvent for the dehydration reaction and the polymerization reaction. The organic amide solvent is preferably stable to an alkali at a high temperature. Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkylpyrrolidone compounds, N-cycloalkylpyrrolidone compounds, N-alkylcaprolactam compounds and N,N-dialkylimidazolidinone compounds are preferred, and N-methyl-2-pyrrolidone (NMP), N-methyl-ε-caprolactam and 1,3-dialkyl-2-imidazolidinones are particularly preferably used. The amount of the organic amide solvent used in the polymerization reaction in the present invention is generally within a range of 0.1 to 10 kg per mol of the sulfur source.

5. Polymerization Aid

In the present invention, various kinds of polymerization aids may be used for promoting the polymerization reaction as needed. Specific examples of the polymerization aids include water, organic carboxylic acid metal salts, organic sulfonic acid metal salts, alkali metal halides such as lithium halides, alkaline earth metal halides, aromatic carboxylic acid alkaline earth metal salts, phosphoric acid alkali metal salts, alcohols, paraffinic hydrocarbons and mixtures of 2 or more compounds thereof, which are generally publicly known as polymerization aids for PASs. Alkali metal carboxylates are preferred as the organic carboxylic acid metal salts. As examples of the alkali metal carboxylates, may be mentioned lithium acetate, sodium acetate, potassium acetate, sodium propionate, lithium valerate, lithium benzoate, sodium benzoate, sodium phenylacetate, potassium p-toluoylate and mixtures of 2 or more compounds thereof. Sodium acetate is particularly preferred as the alkali metal carboxylate because it is cheap and easy to be available. The amount of the polymerization aid used varies according to the kind of the compound used. However, it is generally within a range of generally 0.01 to 10 mol, preferably 0.1 to 2 mol, more preferably 0.2 to 1.8 mol, particularly preferably 0.3 to 1.7 mol per mol of the charged sulfur source. When the polymerization aid is an organic carboxylic acid metal salt, organic sulfonic acid salt or alkali metal halide, it is desirable that the upper limit of the used amount thereof is at most 1 mol, more preferably at most 0.8 mol per mol of the charged sulfur source.

6. Phase Separation Agent

In order to promote the polymerization reaction to obtain a PAS having a high polymerization degree in a short period of time, various kinds of phase separation agents are preferably used in the present invention. The phase separation agent is a compound that is dissolved in the organic amide solvent by itself or under the coexistence of a small amount of water and has a function of lowering the solubility of the PAS in the organic amide solvent. The phase separation agent itself is a compound that is not a solvent for PAS. In the present invention, the phase separation agent may be added prior to the separation step, i.e., at an end stage of the polymerization step, just after completion of the polymerization step or after completion of the polymerization step to form a granular PAS and separate the granular PAS particles in the separation step.

As the phase separation agent, may be used a compound generally known to function as a phase separation agent in the technical field of PASs. The above-described compounds used as the polymerization aid are also included in the phase separation agent. In the present invention, however, the phase separation agent means a compound used in an amount or proportion that can function as a phase separation agent in a step of conducting the polymerization reaction in a phase-separated state, i.e., a phase-separation polymerization step. Specific examples of the phase separation agent include water, organic carboxylic acid metal salts, organic sulfonic acid metal salts, alkali metal halides such as lithium halides, alkaline earth metal halides, aromatic carboxylic acid alkaline earth metal salts, phosphoric acid alkali metal salts, alcohols and paraffinic hydrocarbons. As the organic carboxylic acid metal salts, are preferred alkali metal carboxylates such as, for example, lithium acetate, sodium acetate, potassium acetate, sodium propionate, lithium valerate, lithium benzoate, sodium benzoate, sodium phenylacetate and potassium p-toluoylate. These phase separation agents may be used either singly or in any combination thereof. Among these phase separation agents, water and combinations of water and organic carboxylic acid metal salts such as alkali metal carboxylates are particularly preferred because their costs are cheap, and a post-treatment is easy.

The amount of the phase separation agent used varies with the kind of the compound used. However, it is generally within a range of 0.01 to 10 mol, preferably 0.01 to 9.5 mol, more preferably 0.02 to 9 mol per mol of the charged sulfur source. If the amount of the phase separation agent is less than 0.01 mol per mol of the charged sulfur source or exceeds 10 mol, the phase-separated state cannot be sufficiently created, and so a PAS having a high polymerization degree cannot be obtained.

When the production process of the present invention includes a polymerization step that the phase separation agent is added to conduct a polymerization reaction in the presence of the phase separation agent, it is preferable to control the amount of water so as to bring about a state that water exists in the polymerization reaction system in a proportion of from higher than 2.0 mol to not higher than 10 mol, preferably from 2.2 to 7 mol, more preferably from 2.5 to 5 mol per mol of the charged sulfur source. It is also preferable to use another phase separation agent such as the organic carboxylic acid metal salt than water within a range of preferably 0.01 to 3 mol, more preferably 0.02 to 2 mol, particularly preferably 0.03 to 1 mol per mol of the charged sulfur source.

Even when water is used as the phase separation agent, another phase separation agent than water may be used as a polymerization aid in combination from the viewpoint of efficiently conducting phase-separation polymerization. When water and another phase separation agent are used in combination in the phase-separation polymerization step, the total amount thereof may be an amount sufficient to cause phase separation. In the phase-separation polymerization step, water is caused to exist in a proportion of from higher than 2.0 mol to not higher than 10 mol, preferably from 2.2 to 7 mol, more preferably from 2.5 to 5 mol per mol of the charged sulfur source within the polymerization reaction system, and another phase separation agent may be used in combination within a range of preferably 0.01 to 3 mol, more preferably 0.02 to 2 mol, particularly preferably 0.03 to 1 mol. When water and another phase separation agent are used in combination, water is used within a range of 0.5 to 10 mol, preferably 0.6 to 7 mol, particularly preferably 0.8 to 5 mol per mol of the charged sulfur source, and another phase separation agent such as the organic carboxylic acid metal salt, more preferably the organic carboxylic acid metal salt, particularly preferably the alkali metal carboxylate may also be used in combination within a range of 0.001 to 0.7 mol, preferably 0.02 to 0.6 mol, particularly preferably 0.05 to 0.5 mol in order to perform phase-separation polymerization with a small amount of the phase separation agents.

At least a part of the phase separation agent may be caused to coexist with the polymerization reaction components from the time the polymerization reaction components have been charged. However, it is desirable that the phase separation agent is added in the course of the polymerization reaction to control the amount thereof to an amount sufficient to form phase separation.

II. Polymerization Reaction Step

1. Dehydration Step

A dehydration step is preferably arranged as a preliminary step for a polymerization step to control the amount of water in the reaction system. The dehydration step is performed by a process comprising heating and reacting a mixture containing the organic amide solvent and the alkali metal sulfide, preferably, under an inert gas atmosphere and discharging water outside the system by distillation. When the alkali metal hydrosulfide is used as a sulfur source, the dehydration step is performed by a process comprising heating and reacting a mixture containing the alkali metal hydrosulfide and an alkali metal hydroxide and discharging water outside the system by distillation.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the content of water coexisting in the polymerization reaction system is reduced to generally 0.02 to 2.0 mol, preferably 0.05 to 1.8 mol, more preferably 0.5 to 1.6 mol per mol of the charged sulfur source. As described above, the sulfur source after the dehydration step is called "a charged sulfur source". If the water content has become too low in the dehydration step, water may be added prior to the polymerization step to regulate the water content to a desired value.

When the alkali metal hydrosulfide is used as the sulfur source, a mixture containing the organic amide solvent, the alkali metal hydrosulfide and an alkali metal hydroxide in a proportion of 0.95 to 1.05 mol per mol of the alkali metal hydrosulfide is preferably heated and reacted to discharge at least a part of a distillate containing water from the interior of the system containing the mixture to the exterior of the system.

If a molar ratio of the alkali metal hydroxide to a mole of the alkali metal hydrosulfide in the dehydration step is too low, the amount of a sulfur component (hydrogen sulfide) volatilized off in the dehydration step becomes great, which tends to incur reduction in productivity due to lowering of the amount of the sulfur source or cause abnormal reactions and deterioration of quality of a PAS formed due to increase of a polysulfide component in the charged sulfur source remaining after the dehydration. If the molar ratio of the alkali metal hydroxide to a mole of the alkali metal hydrosulfide is too high, in some cases, change in properties of the organic amide solvent may be increased, difficulty may be encountered on stably performing the polymerization reaction, or the yield and quality of a PAS formed may be deteriorated. A preferable molar ratio of the alkali metal hydroxide to a mole of the alkali metal hydrosulfide in the dehydration step is 0.97 to 1.04, more preferably 0.98 to 1.03.

In many cases, a small amount of an alkali metal sulfide is contained in the alkali metal hydrosulfide, so that the amount of the sulfur source involves a total of the alkali metal hydrosulfide and the alkali metal sulfide. Even when a small amount of the alkali metal sulfide is mixed in, the molar ratio to the alkali metal hydroxide is calculated out on the basis of the content (analytical value) of the alkali metal hydrosulfide in the present invention to regulate the molar ratio between them.

The charging of the respective raw materials into a reaction vessel in the dehydration step is conducted within a temperature range of generally from ordinary temperature (5 to 35° C.) to 300° C., preferably from ordinary temperature to 200° C. The charging order of the raw materials may be optionally set, and the respective raw materials may be additionally charged in the course of the dehydration process. An organic amide solvent is used as a solvent used in the dehydration step. This solvent is preferably the same as the organic amide solvent used in the polymerization step, and NMP is particularly preferred. The amount of the organic amide solvent used is generally of the order of 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system of both systems.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

2. Charging Step

In the present invention, an alkali metal hydroxide and water may be added to the mixture remaining in the system after the dehydration step as needed. When the alkali metal hydrosulfide is used as the sulfur source in particular, the mixture is desirably adjusted in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes preferably 1.00 to 1.09 mol, more preferably more than 1.00 mol, but not more than 1.09 mol, still more preferably 1.001 to 1.085 mol per mol of the sulfur source existing in the system after the dehydration step, i.e., the charged sulfur source, and the number of moles of water becomes generally 0.02 to 2.0 mol, preferably 0.05 to 1.8 mol, more preferably 0.5 to 1.6 mol per mol of the charged sulfur source. The amount of the charged sulfur source is calculated out in accordance with an equation, [Charged sulfur source]=[Total moles of sulfur charged]−[Moles of sulfur volatilized off after dehydration].

When hydrogen sulfide is volatilized off in the dehydration step, an alkali metal hydroxide is produced by an equilibrium reaction and comes to remain in the system. Accordingly, it is necessary to exactly grasp the amount of hydrogen sulfide volatilized off to determine a molar ratio of the alkali metal hydroxide to the sulfur source in the charging step.

If the molar ratio of the alkali metal hydroxide to a mole of the charged sulfur source is too high, it is liable to increase change in properties of the organic amide solvent or cause abnormal reactions or decomposition reactions upon polymerization. In addition, the lowering of the yield and quality of a PAS formed is often caused. The molar ratio of the alkali metal hydroxide to a mole of the charged sulfur source is preferably 1.005 to 1.085 mol, more preferably 1.01 to 1.08 mol, particularly preferably 1.015 to 1.075 mol. It is preferable to conduct the polymerization reaction slightly in excess of the alkali metal hydroxide in that the polymerization reaction is stably performed to obtain a high-quality PAS.

In the present invention, the sulfur source in the charging step is decided to be called "a charged sulfur source" for distinguishing it from the sulfur source used in the dehydration step. The reason for it is that the amount of the sulfur source charged into the reaction vessel in the dehydration step is varied by the dehydration step. The charged sulfur source is consumed by a reaction with a dihalo-aromatic compound in the polymerization step. However, the molar quantity of the charged sulfur source is based on a molar quantity in the charging step.

3. Polymerization Step

The polymerization step is conducted by charging a dihalo-aromatic compound into the mixture after completion of the dehydration step and heating the sulfur source and the dihalo-aromatic compound in the organic amide solvent. When a polymerization vessel different from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid, a phase separation agent and other additives may be mixed.

The mixing of the mixture obtained after completion of the dehydration step with the dihalo-aromatic compound is conducted within a temperature range of generally 100 to 350° C., preferably 120 to 330° C. When the respective components are charged into the polymerization vessel, no particular limitation is imposed on the order of charging, and the charging is conducted by partially charging both components in small portions or charging both components at a time.

In general, in the polymerization step, the charged mixture is heated to a temperature of 170 to 290° C., preferably 180 to 280° C., more preferably 190 to 275° C. to initiate a polymerization reaction, thereby causing the polymerization to proceed. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The polymerization reaction is preferably conducted by a two-stage process of a first-stage polymerization step and a second-stage polymerization step. In that case, the polymerization time is a total of times required for the first-stage polymerization step and the second-stage polymerization step.

The amount of the organic amide solvent used in the polymerization step is within a range of generally 0.1 to 10 kg, preferably 0.15 to 5 kg per mol of the charged sulfur source existing in the polymerization step. The amount may be changed in the course of the polymerization reaction so far as it falls within this range. The content of the coexisting water upon the beginning of the polymerization reaction is desirably controlled within a range of generally 0.02 to 2.0 mol, preferably 0.05 to 1.8 mol, more preferably 0.5 to 1.6 mol per mol of the charged sulfur source. It is preferable to increase the content of the coexisting water in the course of the polymerization reaction.

In the production process of the PAS according to the present invention, it is preferable to subject at least one sulfur source selected from the group consisting of the alkali metal sulfides and the alkali metal hydrosulfides and the dihalo-aromatic compound to a polymerization reaction at a temperature of 170 to 290° C. in the presence of a phase separation agent in the organic amide solvent in the polymerization step. As the phase separation agent, is preferably used any of the compounds described above.

In the production process of the PAS according to the present invention, it is more preferable to subject at least one sulfur source selected from the group consisting of the alkali metal sulfides and the alkali metal hydrosulfides and the dihalo-aromatic compound to a polymerization reaction at a temperature of 170 to 270° C. in the organic amide solvent in the polymerization step, add the phase separation agent into the polymerization reaction mixture at the time a conversion of the dihalo-aromatic compound has reached at least 30%, thereby causing the phase separation agent to exist in the polymerization reaction system, and then raise the temperature of the polymerization reaction mixture to continue the polymerization reaction at a temperature of 245 to 290° C. in the presence of the phase separation agent.

In the production process of the PAS according to the present invention, the polymerization reaction in the polymerization step is preferably conducted through at least two-stage polymerization steps comprising a first-stage polymerization step of subjecting at least one sulfur source selected from the group consisting of the alkali metal sulfides and the alkali metal hydrosulfides and the dihalo-aromatic compound to a polymerization reaction in the organic amide solvent to form a polymer in which a conversion of the dihalo-aromatic compound is 80 to 99%; and a second-stage polymerization step of continuing the polymerization reaction in the presence of the phase separation agent in a phase-separated state that a concentrated formed polymer phase and a dilute formed polymer phase are present in a mixed state within the polymerization reaction system.

In the production process of the PAS according to the present invention, the polymerization reaction in the polymerization step is more preferably conducted through at least two-stage polymerization steps comprising a first-stage polymerization step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer in which a conversion of the dihalo-aromatic compound is 80 to 99%; and a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby continuing the polymerization reaction in a phase-separated state that a concentrated formed polymer phase and a dilute formed polymer phase are present in a mixed state within the polymerization reaction system.

As described above, the first-stage polymerization step is a stage that the conversion of the dihalo-aromatic compound has reached 80 to 99%, preferably 85 to 98%, more preferably 90 to 97% after initiation of the polymerization reaction. If the polymerization temperature becomes too high in the first-stage polymerization step, a secondary reaction or decomposition reaction is easy to occur.

The conversion of the dihalo-aromatic compound is a value calculated out in accordance with each of the following equations. When the dihalo-aromatic compound (hereinafter may be abbreviated as "DHA") is added in excess in terms of a molar ratio to the sulfur source, the conversion is calculated out in accordance with the following equation:

Conversion=[(Charged amount (mol) of DHA)−(Remaining amount (mol) of DHA)]/[(Charged amount (mol) of DHA)−(Excessive amount (mol) of DHA)]×100.

In other case, the conversion is calculated out in accordance with the following equation:

Conversion=[(Charged amount (mol) of DHA)−(Remaining amount (mol) of DHA)]/[(Charged amount (mol) of DHA)]×100.

The amount of the coexisting water in the reaction system in the first-stage polymerization step is within a range of generally 0.02 to 2.0 mol, preferably 0.05 to 1.8 mol, more preferably 0.5 to 1.6 mol, particularly preferably 0.8 to 1.5 mol per mol of the charged sulfur source. The amount of the coexisting water in the first-stage polymerization step may be small. However, undesirable reactions such as decomposition of a PAS formed are easy to occur if the amount of the coexisting water is too small. If the amount of the coexisting water exceeds 2.0 mol, a polymerization rate becomes markedly low, or decomposition of the organic amide solvent and a PAS formed is easy to occur. Thus, such a too small or great amount is not preferable. The polymerization is conducted within a temperature range of 170 to 270° C., preferably 180 to 265° C. If the polymerization temperature is too low, the polymerization rate becomes too slow. If the polymerization temperature is a high temperature exceeding 270° C. on the other hand, decomposition of a PAS formed and the organic amide solvent is easy to occur, and the polymerization degree of the PAS formed becomes extremely low.

In the first-stage polymerization step, it is desirable to form a polymer (may referred to as "a prepolymer") having a melt viscosity of generally 0.5 to 30 Pa·s as measured at a temperature of 310° C. and a shear rate of 1,216 sec$^{-1}$.

The second-stage polymerization step in the present invention is not the mere step of fractionating and granulating a polymer (prepolymer) formed in the first-stage polymerization step, but a step of increasing the polymerization degree of the polymer.

In the second-stage polymerization step, it is preferable to cause the phase separation agent (polymerization aid) to exist in the polymerization reaction system to continue the polymerization reaction in the phase-separated state that the concentrated formed polymer phase and the dilute formed polymer phase are present in a mixed state.

In the second-stage polymerization step, water is particularly preferably used as the phase separation agent, and it is preferable to control the amount of water in the polymerization reaction system so as to bring about a state that water exists in a proportion of from higher than 2.0 mol to not higher than 10 mol, preferably from higher than 2.0 mol to not higher than 9 mol, more preferably from 2.1 to 8 mol, particularly preferably from 2.2 to 7 mol per mol of the charged sulfur source. If the amount of the coexisting water in the polymerization reaction system in the second-stage polymerization step is not more than 2.0 mol or more than 10 mol per mol of the charged sulfur source, the polymerization degree of a PAS formed may be lowered in some cases. It is particularly preferred to conduct the second-stage polymerization in a state that the amount of the coexisting water falls within a range of 2.2 to 7 mol because a PAS having a high polymerization degree is easy to be obtained.

In a more preferred embodiment of the production process according to the present invention, water and another phase separation agent than water may be used as the phase separation agent in combination for performing the polymerization with a small amount of the phase separation agent. In this embodiment, the amount of water in the polymerization reaction system is controlled within a range of 0.1 to 10 mol, preferably 0.3 to 10 mol, more preferably 0.4 to 9 mol, particularly preferably 0.5 to 8 mol per mol of the charged sulfur source, and another phase separation agent than water is preferably caused to exist within a range of 0.01 to 3 mol per mol of the charged sulfur source. Another phase separation agent than water used in the second-stage polymerization step may be selected from the group consisting of organic carboxylic acid metal salts, organic sulfonic acid metal salts, alkali metal halides such as lithium halides, alkaline earth metal halides, aromatic carboxylic acid alkaline earth metal salts, phosphoric acid alkali metal salts, alcohols and paraffinic hydrocarbons. Another phase separation agent particularly preferably used in combination with water is an organic carboxylic acid metal salt, particularly an alkali metal carboxylate. In that case, it is only necessary to use water within a range of 0.5 to 10 mol, preferably 0.6 to 7 mol, particularly preferably 0.8 to 5 mol per mol of the charged sulfur source, and use the alkali metal carboxylate within a range of 0.001 to 0.7 mol, preferably 0.02 to 0.6 mol, particularly preferably 0.05 to 0.5 mol.

The polymerization temperature in the second-stage polymerization is within a range of 245 to 290° C. If the polymerization temperature is lower than 245° C., a PAS having a high polymerization degree is difficult to be obtained. If the polymerization temperature exceeds 290° C., there is a possibility that a PAS formed and the organic amide solvent may be decomposed. In particular, a temperature range of 250 to 270° C. is preferred because a PAS having a high polymerization degree is easy to be obtained.

Water may be added at an end stage of the polymerization reaction or upon completion thereof to increase the water content for the purpose of lowering the contents of a secondarily produced alkali metal salt (for example, NaCl) and impurities in the polymer formed or collecting the polymer in the form of granules. The system of the polymerization reaction may be a batch system, a continuous system or a combination of both systems. In the batch-wise polymerization, 2 or more reaction vessels may be used, if desired, for the purpose of shortening the polymerization cycle time.

III. Separation Step

In the production process of the PAS according to the present invention, a treatment for separating and collecting the PAS formed after the polymerization reaction may be conducted by the same method as the step of separating a PAS formed after an ordinary polymerization reaction. In the separation step, a product slurry that is a reaction mixture containing the PAS formed after completion of the polymerization reaction is cooled, and the product slurry is diluted with water as needed and then separated by filtration, whereby PAS particles can be separated from the reaction mixture and collected.

According to the production process of the PAS including the phase-separation polymerization step, a granular PAS can be formed, so that it is preferable to separate the granular PAS from the reaction mixture by a method of sifting the polymer particles by means of a screen because the polymer particles can be easily separated from by-products, oligomers, etc. The PAS particles may also be sifted from the product slurry in a high-temperature state without cooling the slurry to about room temperature. In addition, the phase separation agent may also be added prior to the separation step, i.e., at an end stage of the polymerization step, just after completion of the polymerization step or after completion of the polymerization step to form a granular PAS and separate the granular PAS particles in the separation step. At that case, the polymerization step may be conducted in the presence of the phase separation agent or in the absence thereof. The amount of the phase separation agent added is as described above.

IV. Washing Step

In the production process of the PAS, the PAS particles separated and collected in the separation step are generally subjected to a washing treatment with at least one washing liquid selected from the group consisting of water, an organic solvent and a mixed solution of water and an organic solvent for lessening a secondarily formed alkali metal salt and oligomers as much as possible. The washing treatment is also conducted in the countercurrent washing step in the production process of the PAS according to the present invention.

As the organic solvent used in the washing treatment is preferred the same organic amide solvent as the polymerization solvent, or an organic solvent such as a ketone (for example, acetone) or an alcohol (for example, methanol or ethanol), and the PAS particles are washed with the organic solvent. One of these organic solvents may be used, or a plurality of them may be mixed and used in combination. Acetone is preferred in that it is excellent in removal efficiency of impurities (low molecular weight component) such as oligomers and decomposed products and even from the viewpoints of profitability and safety. When a plurality of organic solvents are mixed and used in combination, the organic solvents preferably include acetone, and the organic solvents containing acetone in a proportion of at least 50% by mass, preferably at least 70% by mass are preferably used.

As water used in the washing treatment, may be used deionized water such as ion-exchanged water, distilled water or ultrapure water.

A mixed solution of water and acetone is more preferably used as the washing liquid. A mixed solution containing water in a proportion of preferably 1 to 60% by mass, more preferably 1 to 30% by mass, particularly preferably 1 to 20% by mass is preferably used as the mixed solution in that removal efficiency of organic impurities such as oligomers and decomposed products is enhanced.

The washing treatment with the washing liquid is generally performed by mixing and stirring the PAS collected through the separation step and the washing liquid, and this treatment is preferably performed plural times, not limited to once, and generally performed 2 to 4 times. The amount of the washing liquid used in each washing treatment is generally 1 to 15 times, preferably 2 to 10 times, more preferably 3 to 8 times as much as the volume of a theoretical PAS polymer (volume of a PAS polymer from which water and the organic solvent have been removed by drying or the like). The washing time is generally 1 to 120 minutes, preferably 3 to 100 minutes, more preferably 5 to 60 minutes. When the washing treatment is conducted with the organic solvent, a washing treatment with water is preferably performed once or plural times for enhancing removal efficiency of the organic impurities and removing the inorganic salt such as NaCl.

The washing treatment is generally conducted at ordinary temperature (10 to 40° C.). However, the treatment may also be conducted at a lower or higher temperature than the ordinary temperature so far as the washing liquid is kept in a liquid state. For example, hot water may be used as the washing liquid for enhancing the detergency of water.

As described above, the method of the washing treatment includes batch washing and continuous washing. The batch washing is a method of washing a polymer collected with a washing liquid under stirring in a washing vessel having a predetermined capacity. The continuous washing is a method of continuously bringing a polymer in a wet state into countercurrent contact with an organic solvent or water that is a washing liquid in a washing vessel. Since it is essential that the current of a polymer in a wet state (may be in a slurry state) and the current of the washing liquid travel in opposed directions in the continuous washing attended with countercurrent contact, there are a method of causing the current of the washing liquid to proceed upward and a method of causing the current of the washing liquid to proceed downward. A plurality of continuous washing treatments different in the traveling directions of the washing liquid may also be combined if desired. Batch washing may also be conducted prior to the continuous washing.

The present invention includes a countercurrent washing step described in the following item V.

V. Countercurrent Washing Step

A feature of the present invention resides in including, as a washing step, a countercurrent washing step that is a step of further washing the PAS particles separated in a state of an aqueous slurry with at least one washing liquid selected from the group consisting of water, an organic solvent and a mixed solution of water and an organic solvent, preferably after the above-described washing treatment by the batch washing, wherein a PAS particle-containing aqueous slurry is caused to proceed downward in a washing vessel, the washing liquid is caused to proceed upward to continuously bring the washing liquid into countercurrent contact with the aqueous slurry, thereby conducting countercurrent washing, the PAS particles are discharged from a lower portion of the washing vessel, and a washing waste liquid is discharged from an upper portion of the washing vessel.

Figure 1:
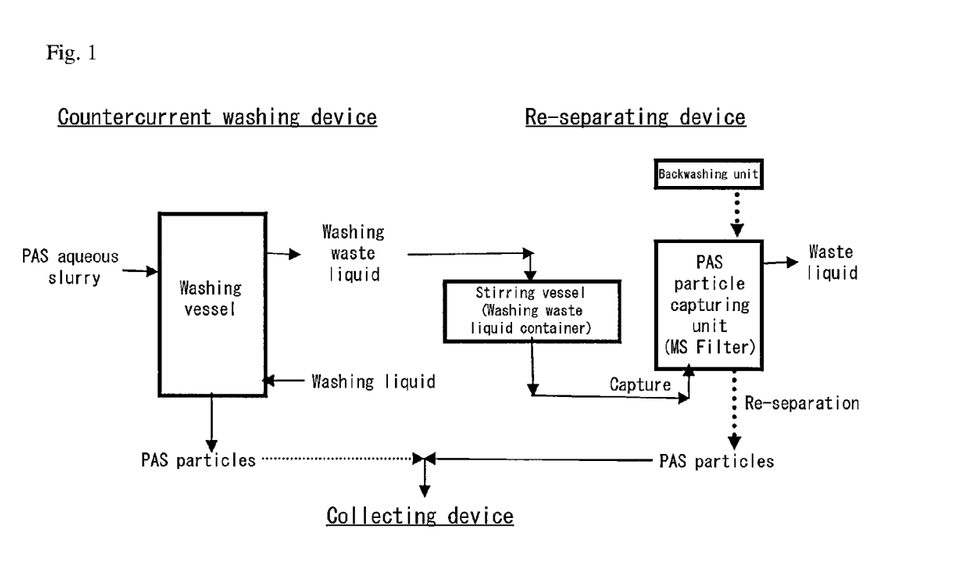
FIG. 1 is a conceptual diagram illustrating specific examples of a countercurrent washing device, a PAS particle re-separating device and a collecting device according to the present invention.

As schematically illustrated in a conceptual diagram illustrating specific examples of a countercurrent washing device, a PAS particle re-separating device and a collecting device in FIG. 1, the countercurrent washing step according to the present invention is generally conducted by the countercurrent washing device in which the PAS particle-containing aqueous slurry is caused to proceed downward in the washing vessel, the washing liquid is caused to proceed upward to continuously bring the washing liquid into countercurrent contact with the aqueous slurry, thereby conducting countercurrent washing, the PAS particles are discharged from a lower portion of the washing vessel, and a washing waste liquid is discharged from an upper portion of the washing vessel.

In the present invention, only one such a countercurrent washing step or a plurality of washing steps may be provided in the step of washing the PAS particles. Accordingly, one or more such countercurrent washing devices may be provided in the present invention.

When the plurality of countercurrent washing steps of bringing the washing liquid into countercurrent contact with the PAS particle-containing aqueous slurry to conduct countercurrent washing are provided in the step of washing the PAS particles, a PAS particle re-separation step, which will be described subsequently, may be conducted as to all the countercurrent washing steps. However, the PAS particle re-separation step in the present invention may also be conducted as to only one countercurrent washing step thereof. In addition, the PAS particle re-separation step in the present invention may also be conducted as to each of several countercurrent washing steps or as to a combination of plural countercurrent washing steps.

When the PAS particle re-separation step in the present invention is conducted as to the several countercurrent washing steps, the PAS particle re-separation step in the present invention is preferably conducted as to a countercurrent washing step considered to be great in the flowing-out of PAS particles, and it is only necessary to select such a step in view of the amount of the washing liquid supplied, a supply rate thereof, etc.

With respect to the washing vessel in the countercurrent washing device used in the countercurrent washing step, no limitation is imposed on the shape and size thereof so far as the PAS particle-containing aqueous slurry can be caused to proceed downward, and the washing liquid can be caused to proceed upward to continuously bring the washing liquid into countercurrent contact with the aqueous slurry, thereby conducting countercurrent washing. A washing vessel having a substantially cylindrical shape vertically provided, i.e., a washing tower, is preferably adopted for smoothly conducting movements of the PAS particle-containing aqueous slurry and the washing liquid and causing the countercurrent washing to efficiently proceed. The size of the washing vessel or washing tower may be suitably selected according to a desired throughput. In specific examples which will be described subsequently, a device having an inside diameter of generally about 5 to 50 cm, preferably 10 to 40 cm, more preferably 15 to 35 cm and a length (a height in case of the washing tower) of generally about 50 to 300 cm, preferably 80 to 250 cm, more preferably 100 to 200 cm is used. The size of the washing vessel or washing tower may be changed in proportion to the throughput, i.e., supply rates of the PAS particle-containing aqueous slurry and the washing liquid per time.

It is preferable to provide a static mixer, an agitating blade, a conveying screw or the like in the interior of the washing vessel for sufficiently conducting the countercurrent contact of the PAS particle-containing aqueous slurry with the washing liquid. The size and number thereof may be suitably selected according to a desired throughput.

In the washing vessel used in the countercurrent washing step, an aqueous slurry supply port for supplying the PAS particle-containing aqueous slurry is provided at a top portion, a polymer particle discharge port for discharging a slurry containing PAS particles subjected to the washing treatment is provided at a lower end of a bottom portion, a washing liquid supply port for supplying the washing liquid is provided at the bottom portion, and a washing waste liquid discharge port for discharging a washing waste liquid in which a water-soluble metal salt removed from the PAS particle-containing aqueous slurry by the washing, remaining hydrogen sulfide and the like have been dissolved is provided at an upper end of the top portion or in the vicinity of the upper end. As described above, PAS particle may be discharged from the washing waste liquid discharge port in attendance upon the washing waste liquid, and so solution is required from the viewpoints of improvement in the yield of a product and reduction in an environmental burden.

Figure 2:
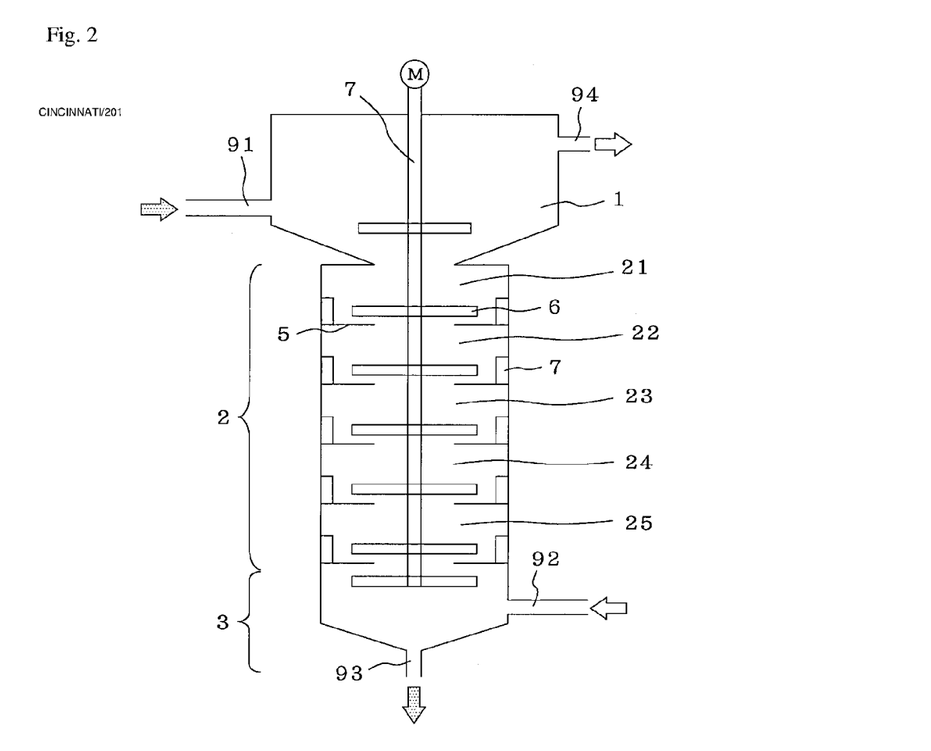
FIG. 2 is a schematic drawing illustrating a specific example of the countercurrent washing device according to the present invention.

FIG. 2 illustrates an exemplary typical longitudinal sectional view of a washing tower used in the countercurrent washing step as a schematic drawing illustrating a specific example of the countercurrent washing device. The washing tower illustrated in FIG. 2 is composed of a tower top portion 1, a body portion 2 and a tower bottom portion 3. The body portion 2 is divided into 5 stirring chambers 21 to 25, and the respective stirring chambers are mutually partitioned by partitioning plates 5 having an opening in a center. A flat paddle agitating blade 6 is arranged in each of the stirring chambers 21 to 25. The flat paddle agitating blade 6 is rotationably fixed to a common shaft of agitator 7 extending through the tower top portion 1 and the body portion 2.

An aqueous slurry supply port 91 and a washing waste liquid discharge port 94 are provided at the tower top portion 1, and a washing liquid supply port 92 and a polymer particle discharge port 93 are provided at the tower bottom portion 3. In this embodiment, the tower top portion 1 is designed to have a flow path area enlarged to about 1 to 4 times as much as the body portion 2 in such a manner that the PAS particle-containing aqueous slurry introduced from the aqueous slurry supply port 91 is hard to be subjected to axial backmixing by a liquid current discharged from the washing waste liquid discharge port 94.

In the device of such a structure, the PAS particle-containing aqueous slurry introduced into the tower top portion 1 from the aqueous slurry supply port 91 is introduced into the first stirring chamber 21 and falls while being stirred by the flat paddle agitating blade 6 arranged in the stirring chamber 21. On the other hand, an upward current of the washing liquid introduced from the washing liquid supply port 92 is attracted to the agitating blade 6 and stirred and mixed with the aqueous slurry introduced from above the agitating blade. By such a series of fluidic actions, the countercurrent contact of the aqueous slurry with the washing liquid is caused to proceed in the stirring chamber 21. Likewise, the countercurrent washing is caused to proceed even in the stirring chambers 22 to 25 while being successively subjected to stirring and mixing.

A method for preparing the aqueous slurry supplied from the aqueous slurry supply port 91 may be either a method of supply the PAS particles separated after the washing treatment as an aqueous slurry again or a method of collecting a fixed amount of the PAS particles separated and then supplying the thus-collected PAS particles as an aqueous slurry.

As the washing liquid used in the countercurrent washing step, is used water or a mixed solvent of a liquid having affinity for water, such as acetone or an alcohol, and water. However, an aqueous washing liquid comprising water as a main component is preferably used because a washing waste liquid after collection does not require a treatment for separating components, and an aqueous washing liquid containing water in a proportion of at least 50% by mass, preferably at least 60% by mass, more preferably at least 70% by mass is favorably used. As the water, may be used deionized water, distilled water, ultrapure water or the like.

The washing liquid supply port for supplying the washing liquid may be provided at 2 or more places if desired.

Incidentally, in order to enhance the degree of crystallinity of the resulting PAS in the production process of the PAS, an acid treatment that the PAS is brought into contact with an acidic compound, such as an inorganic acid such as hydrochloric acid or phosphoric acid, or an organic acid such as acetic acid may be conducted in some cases. The countercurrent washing step or countercurrent washing device in the present invention may also be applied to this acid treatment or a device for this treatment. When applied to the acid treatment, the acidic compound is added to the PAS particle-containing aqueous slurry.

The amount of the PAS particle-containing aqueous slurry supplied and the amount of the washing liquid supplied may be suitably controlled in view of the size of the washing vessel, a stirring speed of the agitating blade, a washing bath ratio determined by a mass ratio of the washing liquid to the PAS particles in the aqueous slurry, contents of impurities considered, temperatures and viscosities of the PAS particle-containing aqueous slurry and the washing liquid, an average contact time of the PAS particle-containing aqueous slurry with the washing liquid, etc.

According to the finding of the present inventors, it has been found that a precipitation rate of the PAS particles and countercurrent washing efficiency of the PAS particles depend on a viscosity of a liquid phase in each stirring chamber. The viscosity of the liquid phase is determined by the kinds and concentrations of an organic solvent in the PAS particle-containing aqueous slurry and an organic solvent used as the washing liquid, and a temperature. Accordingly, in order to homogenize the precipitation rate of solid particles and control the rising of the solid particles and their flowing-out through a waste liquid flow path, it is necessary to control the temperatures of the PAS particle-containing aqueous slurry supplied to the washing vessel and the washing liquid. The temperature of the PAS particle-containing aqueous slurry is generally within a range of 30 to 70° C., and the temperature of the washing liquid is generally within a range of 15 to 40° C. Therefore, the temperature of the aqueous slurry or washing liquid is preferably controlled by, for example, providing a temperature control unit directly at the aqueous slurry supply port 91 or the washing liquid supply port 92 or in the vicinity thereof.

The treating method or treating device of the present invention, i.e., the countercurrent washing step or countercurrent washing device, is efficient because it can be applied to a supply rate of a range as wide as generally 1 to 800 kg/hr, preferably 3 to 700 kg/hr, more preferably 5 to 600 kg/hr as the supply rate of the washing liquid. In addition, it is only necessary to control the supply rate of the washing liquid within a range of generally about 1 to 15, preferably about 1 to 10, more preferably about 1 to 7, particularly preferably about 1 to 5 in terms of the washing bath ratio described above. If the supply rate of the washing liquid is too high, the falling of the PAS particles in the PAS particle-containing aqueous slurry is prevented, and so the amount of PAS particles discharged in attendance upon the washing waste liquid may be increased in some cases. As a result, washing efficiency becomes insufficient. If the supply rate of the washing liquid is too small, the washing is not sufficiently performed.

VI. Re-Separation Step

A feature of the present invention resides in including a PAS particle re-separation step of supplying the washing waste liquid discharged from the washing vessel to a PAS particle re-separating unit, in which a micro-slit filter has been installed, to capture PAS particles and then re-separating the PAS particles from the micro-slit filter by blowing, preferably, the washing liquid and a compressed gas against the micro-slit filter, on which the PAS particles have been captured, to discharge them.

The micro-slit filter is a filter having a shape that a wire is strongly wound on a waved polygonal tube made of stainless steel, thereby winding and arranging slit-like pores around the tube, and MS Filter (product of TOTOKU ELECTRIC CO., LTD.) and the like are known. The micro-slit filter has heretofore been known as a filter element developed for cleaning waste water containing a relatively small amount of solid particles by introducing the waste water into the interior thereof and discharging a filtrate, from which the solid particles have been removed, to the outside through the slit-like pores. In the micro-slit filter, slits can be selected according to the size of particles to be filtered off, and so the micro-slit filter can be applied to a wide variety of fields from precision filtration for medicines, ultrapure water, biotechnology, etc. to large-scaled filtration such as a micro-strainer for seawater.

In addition, the micro-slit filter is known to reproduce its capability of capturing particles to be filtered off by backwashing, i.e., by reversely injecting a mixture of a small amount of a liquid and a compressed gas to remove the particles captured by the filter, thereby returning the filter to an original state.

As schematically illustrated in FIG. 1, the present invention intends to conduct a PAS particle re-separation step by a PAS particle re-separating device having a PAS particle capturing unit equipped with the micro-slit filter, to which the washing waste liquid discharged from the washing vessel in the countercurrent washing device is supplied to capture PAS particles, and a backwashing unit for re-separating the PAS particles from the micro-slit filter by blowing, preferably, the washing liquid and a compressed gas against the micro-slit filter, on which the PAS particles have been captured, to discharge them. The supply of the washing waste liquid to the PAS particle re-separating unit may be such that the washing waste liquid discharged from the washing vessel in the countercurrent washing device is supplied as it is. Alternatively, the washing waste liquid discharged from the washing vessel in the countercurrent washing device may be supplied to the PAS particle capturing unit after the washing waste liquid is stored in a container having a desired capacity as schematically illustrated in FIG. 1, and stirring is then conducted to homogenize the composition of the washing waste liquid. In addition, compressed air or compressed nitrogen may be used as the compressed gas, and compressed air is preferably used for the sake of brevity.

According to the PAS particle re-separation step of the present invention, the PAS particles can be collected at a yield of generally 90 to 99.5%, preferably 92 to 99.5%, particularly preferably 95 to 99.5% to the whole amount of PAS particles discharged from the washing waste liquid discharge port in attendance upon the washing waste liquid. That is, the PAS particles discharged in attendance upon the washing waste liquid can be almost completely collected as a product, so that a yield of the product is improved. Incidentally, a backwashing operation is periodically conducted, whereby the capability of capturing the PAS particles in the micro-slit filter is almost completely reproduced, so that the filter is not clogged for a long period of time, and a maintenance cost of the equipments is greatly reduced.

No particular limitation is imposed on the size of the slits of the micro-slit filter so far as the PAS particles discharged in attendance upon the washing waste liquid can be almost completely captured, and all of said PAS particles can be removed and collected from the filter by the backwashing operation. However, it is only necessary to control the size within a range of generally 30 to 200 μm, preferably 40 to 120 μm, more preferably 45 to 100 μm, particularly preferably 50 to 80 μm in terms of an aperture (sieve opening size).

The washing waste liquid discharged from the washing waste liquid discharge port located at the top portion of the washing vessel in the countercurrent washing device is supplied to the PAS particle re-separating device provided adjacently to the washing tower (vessel). The PAS particle re-separating device is a PAS particle re-separating unit, in which the micro-slit filter has been installed. Specifically, in the micro-slit filter installed in the PAS particle capturing unit, a washing waste liquid supply port is provided at a lower portion, and a filtrate discharge port is provided at an upper portion. A backwashing unit for reproducing the micro-slit filter by blowing a backwashing fluid composed of the washing liquid and a compressed gas against the filter is fitted to the filtrate discharge port so as to permit changing over and connecting by opening and closing a valve. In addition, a backwashing fluid discharge port for discharging the PAS particles captured by the filter and the backwashing fluid when the backwashing has been conducted by the backwashing unit is fitted to the washing waste liquid supply port so as to permit changing over and connecting by opening and closing a valve.

The washing waste liquid may be supplied directly to the micro-slit filter from the washing waste liquid discharge port of the washing vessel. However, it is preferable to supply the washing waste liquid to the micro-slit filter after the washing waste liquid is supplied to a stirring vessel provided adjacently to the micro-slit filter, a predetermined amount of the washing waste liquid is stored therein, and stirring is then conducted to homogenize the composition of the washing waste liquid.

As described above, PAS particles that cannot precipitate due to the upward current of the washing liquid is attendantly contained in the washing waste liquid together with a waste liquid of the washing liquid after the PAS particles in the PAS particle-containing aqueous slurry are washed, the water-soluble inorganic substance and the acidic compound. Since such PAS particles are almost completely captured by the micro-slit filter, a washing waste liquid composed of the washing liquid, the water-soluble inorganic substance and the acidic compound is discharged from the filtrate discharge port.

After the valves are then changed over to connect the backwashing unit and the backwashing fluid discharge port to the filtrate discharge port and the washing waste liquid supply port, respectively, the backwashing fluid composed of the washing liquid and the compressed gas is supplied from the backwashing unit, whereby the PAS particles captured by the micro-slit filter are separated from the micro-slit filter and discharged from the backwashing fluid discharge port together with the backwashing fluid after the backwashing. After the backwashing fluid and PAS particles discharged from the backwashing fluid discharge port are stored in a container as needed, the PAS particles are re-separated by means of a screen or a centrifugal separator. When filtration is conducted by means of the screen, a wet cake of PAS having a liquid content of generally about 30 to 75% by mass, often about 40 to 65% by mass is obtained. A wet cake having a low liquid content may also be provided by means of the centrifugal separator. The PAS particles are re-separated by filtration after the wet cake is further washed with water or the like or without conducting the washing.

The PAS particles re-separated and discharged are supplied to the collecting device, further washed with water if desired and then dried, or dried without conducting the washing, whereby the PAS particles can be collected. Such PAS particles re-separated, discharged and collected from the washing waste liquid may also be provided as a product by themselves. Such PAS particles may be mixed with the PAS particles discharged from the polymer particle discharge port located at the lower portion of the washing vessel in the countercurrent washing step and collected by further washing them with water if desired and then conducting drying or conducting drying without conducting the washing, thereby providing the resultant mixture as a product.

Alternatively, after the PAS particles re-separated and discharged from the washing waste liquid are mixed with the PAS particles discharged from the polymer particle discharge port located at the lower portion of the washing vessel in the countercurrent washing step, the resultant mixture may also be further washing with water if desired and then dried, or dried without conducting the washing to collect the mixed PAS particles.

Since the PAS particles heretofore discharged in attendant upon the washing waste liquid can be re-separated at a high yield and collected as a product in this manner, the yield of the product is improved, and there is no need to conduct a cleaning treatment for the washing waste liquid.

The PAS particle re-separating device according to the present invention, in which the micro-slit filter has been installed, has the following features: (i) the size of the slits of the micro-slit filter can be suitably selected, thereby almost completely re-separating fine PAS particles from the washing waste liquid; (ii) the micro-slit filter can be subjected to a backwashing operation, thereby almost completely reproducing its capability of capturing particles and performing the backwashing repeatedly; (iii) foreign matters such as metal particles and pieces of a filter medium are scarcely produced even when the operation is conducted for a long period of time; and (iv) the device is not corroded by the washing liquid.

Since the PAS particle re-separated and discharged from the washing waste liquid by the PAS particle re-separating device equipped with the micro-slit filter according to the present invention are not contaminated with foreign matters such as metal particles and pieces of the filter medium, a great feature resides in that those that are not collected as a product by a conventional filter can be collected as a product.

VII. PAS Particle Collecting Step

The PAS particles subjected to the washing treatment are separated from the washing liquid by means of a screen or a centrifugal separator. As the screen, may be used a screen having a sieve opening size within a range of 63 μm (250 mesh) to 500 μm (32 mesh), preferably 75 μm (200 mesh) to 250 μm (60 mesh). When filtration is conducted by means of the screen, a wet cake of PAS having a liquid content of generally about 30 to 75% by mass, often about 40 to 65% by mass is obtained. A wet cake having a low liquid content may also be provided by means of the centrifugal separator. The PAS particles are re-separated by filtration and collected after the wet cake is further washed with water or the like or without conducting the washing.

In order to enhance the degree of crystallinity of the resulting PAS, an acid treatment that the PAS particles are brought into contact with an inorganic acid such as hydrochloric or an organic acid such as acetic acid may also be conducted before the PAS particles are separated and collected.

The PAS particles are further washed with water as needed and then dried, or dried without conducting the washing, thereby collecting the PAS particles formed.

VIII. Poly(Arylene Sulfide)

According to the production process of the PAS of the present invention, a PAS having a melt viscosity of generally 1 to 100 Pa·s, preferably 2 to 80 Pa·s, particularly preferably 3 to 70 Pa·s as measured at a temperature of 310° C. and a shear rate of 1,216 $sec^{-1}$ can be obtained. According to the production process of the PAS of the present invention, a PAS having a mass-average molecular weight of generally 10,000 to 300,000, preferably 13,000 to 200,000, particularly preferably 14,000 to 100,000 can be obtained.

When the PAS obtained by the production process of the PAS according to the present invention is a polymer obtained by using pDCB as DHA, the content of pDCB remaining in the polymer can be controlled to generally at most 500 ppm (mg/kg-PAS), preferably at most 400 ppm, more preferably at most 350 ppm.

According to the production process of the PAS of the present invention, a granular PAS having an average particle size (as measured by a laser diffraction/scattering method) of 50 to 1,000 μm, preferably 70 to 800 μm, more preferably 200 to 700 μm can be obtained. In addition, according to the production process of the PAS of the present invention, a granular PAS having a specific surface area of 0.1 to 500 m$^2$/g, preferably 1 to 200 m$^2$/g, more preferably 3 to 80 m$^2$/g as measured by the BET method by nitrogen adsorption can be obtained, so that a granular PAS which is in the form of granules and excellent in handling property is provided.

EXAMPLES

The present invention will be described more specifically by Example, Comparative Examples and Control Example. However, the present invention is not limited to the following specific examples alone.

Example (Dehydration Step)

A 20-liter autoclave was charged with 6,004 g of NMP, 2,000 g of sodium hydrosulfide aqueous solution (NaSH; concentration: 62% by mass, containing 28 g of Na$_2$S) and 1,191 g of sodium hydroxide (NaOH; concentration: 74% by mass). A molar ratio of sodium hydroxide/sulfur source (NaOH/S) was 0.997, and a molar ratio of NaOH/NaSH was 1.012. These sodium hydrosulfide and sodium hydroxide of the respective concentrations contain water such as water of hydration as a residual component.

After the interior of the autoclave was purged with nitrogen gas, the contents were gradually heated to 200° C. over about 4 hours while stiffing at 250 rpm by a stirrer to distill off 1,006 g of water (H$_2$O), 1,287 g of NMP and 12 g of hydrogen sulfide (H$_2$S).

(Polymerization Step)

After the dehydration step, the contents in the autoclave were cooled to 150° C., and 3,380 g of pDCB, 3,456 g of NMP, 19.29 g of sodium hydroxide (high-purity product) and 149 g of ion-exchanged water were added. A ratio (g/mol) of NMP/charged sulfur source (hereinafter abbreviated as "charged S") in the autoclave was 375, a ratio (mol/mol) of pDCB/charged S was 1.060, a ratio (mol/mol) of H$_2$O/charged S was 1.50, and a ratio (mol/mol) of NaOH/charged S was 1.060.

While stiffing the contents in the autoclave at 250 rpm by a stirrer, a reaction was conducted for 3 hours at a temperature of 220° C. to conduct first-stage polymerization.

After completion of the first-stage polymerization, the number of revolutions of the stirrer was increased to 400 rpm, and 444 g of ion-exchanged water was charged under pressure while continuing the stirring of the contents. A ratio (mol/mol) of H$_2$O/charged S was 2.63. After ion-exchanged water was charged under pressure, the contents were heated to 255° C. and reacted for 4 hours to conduct second-stage polymerization. A conversion of pDCB was 95%.

(Separation Step)

After completion of the second-stage polymerization, the contents were cooled near to room temperature and then sifted through a screen having a sieve opening size of 150 μm to separate and collect a granular PPS polymer, thereby obtaining a wet cake (water content: 60%).

(Washing Step)

A mixed solution of ion-exchanged water and acetone as a washing liquid was added to the wet cake of the PPS separated, and the cake was washed under stirring for 30 minutes in a stirring vessel. The amount of the washing liquid is 5 times as much as a theoretical amount of the polymer collected (an amount of the PPS polymer in the wet cake), and the water content in the washing liquid is 5% by mass. This washing was conducted 3 times. Each washing was conducted by controlling the temperature of the washing liquid to room temperature. After the washing, the polymer was separated and collected to obtain a wet cake.

(Countercurrent Washing Step)

A process from the dehydration step to the washing step was conducted repeatedly to produce the wet cake of the PPS polymer in a large amount, and such a wet cake was subjected to the following countercurrent washing step.

A washing tower illustrated in FIG. 2 was used to conduct a countercurrent washing treatment. The washing tower is in a cylindrical form having an inside diameter of 25 cm and a height of 150 cm, 5 stirring chambers (each, diameter: 25 cm; height: 16 cm) are mutually partitioned by partitioning plates in a body portion having a height of 81 cm and connected in a vertical direction. In each stirring chamber, 4 flat paddle blades are fixed to a shaft of agitator at intervals of 90° to one another at a potion of 22 to 42 mm above the partition plate. In the washing tower, the shaft of agitator was rotated at 200 rpm.

To the washing tower, were respectively supplied a PPS slurry (PPS concentration: 30.0% by mass) prepared by using a mixed solution (mass ratio: 3:1) of ion-exchanged water and acetone and having a liquid temperature of 40° C. in a proportion of 5.0 kg/hr from an aqueous slurry supply port 91, and ion-exchanged water of 25° C. in a proportion of 7.0 kg/hr from a washing liquid supply port 92. A washing waste liquid was discharged in a proportion of 7.0 kg/hr from a washing waste liquid discharge port 94, and a washed slurry was discharged in a proportion of 5.0 kg/hr from a polymer particle discharge port 93 located at a bottom portion. The concentration of a PPS collected by sifting the washed slurry discharged from the polymer particle discharge port 93 by a screen having a sieve opening size of 75 μm was 29.5% by mass, and the concentration of acetone was 0.3% by mass.

(Re-Separation Step)

The washing waste liquid discharged in the proportion of 7.0 kg/hr from the washing waste liquid discharge port 94 was supplied to a PAS particle re-separating unit equipped with a stirring vessel and MS Filter (product of TOTOKU ELECTRIC CO., LTD.). That is, after the washing waste liquid was supplied to the stirring vessel to conduct a stirring treatment and homogenize the composition of the washing waste liquid, the thus-treated washing waste liquid was supplied in a proportion of 7.0 kg/hr likewise to a washing waste liquid supply port of the micro-slit filter having a sieve opening size of 75 μm (200 mesh). PPS particles were captured by the filter, and a filtrate was discharged in a proportion of about 7.0 kg/hr from a filtrate discharge port. No PPS particle was observed in the filtrate. After the washing waste liquid was caused to continuously flow for a day (24 hr), a valve was changed over to supply a backwashing fluid composed of ion-exchanged water and compressed air from a backwashing unit, thereby re-separating and removing the PPS particle captured by the micro-slit filter from the filter and discharging them together with the backwashing fluid from a backwashing fluid discharge port to collect them in a re-separation container (not illustrated). The valve was changed over again to repeat the process of the capture of the PPS particles and the collection of the PPS particles by the re-separation using the backwashing fluid 10 times every 24 hours. The PPS particles stored for 10 days (240 hr) were separated by filtration through a screen having a sieve opening size of 75 μm (200 mesh), washed with ion-exchanged water and then dried to obtain PPS particles. The PPS particles obtained by the first PPS particle re-separation step weighed 5.94 kg.

Likewise, the PPS particle re-separation step for 10 days (240 hr) in total, in which the process of the capture of the PPS particles and the collection of the PPS particles by the re-separation using the backwashing fluid was repeated 10 times every 24 hours, was repeated additionally 4 times. As a result, no PPS particle was observed in the filtrates to the end. Respective collection results by the PPS particle re-separation steps from the first time to the fifth time, that is, amounts (unit: kg) of re-collected PPS after 10 days (240 hr) elapsed are shown in Table 1.

The collecting process by this PPS particle re-separation step of the unit of 10 days (240 hr) was repeated 10 times (100 days in total). As a result, no trace of foreign matter such as metals was observed in PPS particles collected by the re-separation of PPS particles.

Comparative Example 1

The re-separation step was performed in the same manner as in Example except that a filter equipped with a welded wire mesh made of stainless steel having a sieve opening size of 75 µm (200 mesh) in place of MS Filter (product of TOTOKU ELECTRIC CO., LTD.) having a sieve opening size of 75 µm (200 mesh) was used. A filtrate was discharged in a proportion of about 7.0 kg/hr from the filtrate discharge port, and no PPS particle was observed in this filtrate. After a washing waste liquid was caused to continuously flow for 24 hours, the welded wire mesh was removed from the filter. High-pressure washing water was blown against the welded wire mesh removed to separate PPS particles and discharge them together with the washing water from the backwashing fluid discharge port, thereby collecting them in the re-separation container. The welded wire mesh after the PPS particles were separated was installed in the filter to repeat the process of the supply of the washing waste liquid and the collection of the PPS particles in the re-separation container 10 times every 24 hours. The PPS particles stored for 10 days (240 hr) were separated by filtration through a screen having a sieve opening size of 38 µm (400 mesh), washed with ion-exchanged water and then dried to obtain PPS particles by the collection of the first time. The thus-obtained PPS particles weighed 5.88 kg.

The PPS particle re-separation step for 10 days (240 hr) in total was repeated additionally 4 times in the same manner as in Example. Collection results of PPS particles up to the fifth re-separation step are shown in Table 1. Incidentally, from the fourth re-separation step, PPS particles which were not captured by the welded wire mesh, but suspended in the filter were observed.

The collecting process by this PPS particle re-separation step of the unit of 10 days (240 hr) was repeated 10 times (100 days in total). As a result, traces of foreign matter such as metals were observed in PPS particles collected by the re-separation of PPS particles.

Comparative Example 2

First to fifth re-separation steps were performed in the same manner as in Comparative Example 1 except that a filter equipped with a welded wire mesh made of stainless steel having a sieve opening size of 38 µm (400 mesh) in place of the welded wire mesh made of stainless steel having the sieve opening size of 75 µm (200 mesh) was used. Collection results of PPS particles up to the fifth re-separation step are shown in Table 1. Incidentally, from the third re-separation step, PPS particles which were not captured by the welded wire mesh, but suspended in the filter were observed, and it was confirmed that the welded wire mesh was clogged in the fifth re-separation step.

The collecting process by this PPS particle re-separation step of the unit of 10 days (240 hr) was repeated 10 times (100 days in total). As a result, traces of foreign matter such as metals were observed in PPS particles collected by the re-separation of PPS particles.

Control Example

PPS collected by sifting the washing waste liquid discharged from the washing waste liquid discharge port 94 of the washing tower by a screen having a sieve opening size of 75 µm (200 mesh) without conducting the PPS particle re-separation step weighed 5.87 kg for 10 days (240 hr).

TABLE 1

| Filter (sieve opening size) | Example MS Filter (200 mesh) | Comparative Example 1 Welded wire mesh (200 mesh) | Comparative Example 2 Welded wire mesh (400 mesh) | Control Example Not perform re-separation step (200 mesh) |
| --- | --- | --- | --- | --- |
| First time | 5.94 | 5.88 | 5.92 | 5.87 |
| Second time | 5.93 | 5.49 | 5.46 | (Not measured) |
| Third time | 5.95 | 5.18 | 4.88 | |
| Fourth time | 5.92 | 4.66 | 4.12 | |
| Fifth time | 5.93 | 4.10 | 3.02 | |

As apparent from Table 1, it is understood that in Example of the present invention including the countercurrent washing step using the countercurrent washing device equipped with the PAS particle re-separating unit in which the micro-slit filter has been installed, the effect to re-separate PPS particles is excellent. In addition, in Example of the present invention, the micro-slit filter can be reproduced by backwashing, so that the filter is not clogged even when it is used for a long period of time, and so the excellent re-separating effect is retained.

On the other hand, in Comparative Example 1 and 2 in which the micro-slit filter was not used as the filter in the PAS particle re-separation step, the PPS particles captured from the washing slurry could not be sufficiently separated from the welded wire mesh, resulting in the fact that the re-separating effect is somewhat poor. In addition, it has been found that the re-separating effect is lowered when the welded wire mesh is used repeatedly for a long period of time, and so such a wire mesh comes to fail to capture PPS particles.

Incidentally, from the results of Control Example in which the PPS particle re-separation step was not performed, it is inferred that fine PPS particles passing through the screen having a sieve opening size of 75 µm are contained in the washing waste liquid. However, it is understood that these fine PPS particles are also captured and re-collected by the PPS particle re-separation step according to the present invention.

In Example of the present invention, the PPS particles re-separated and discharged in the PPS particle re-separation step are collected as they are. However, even when the PPS particles re-separated and discharged in the PPS particle re-separation step were supplied to the PAS particles discharged from the polymer particle discharge port 93 located at the lower portion of the washing tower in the countercurrent washing step and collected, the yield of the product was improved to the same level without impairing the quality of the PPS.

INDUSTRIAL APPLICABILITY

The present invention is directed to the production process of the PAS including the particular countercurrent washing step or the production apparatus of the PAS including the particular countercurrent washing device, whereby almost all the PAS particles discharged in attendance upon the discharge of the washing liquid can be re-separated and collected as a product, and a high-quality PAS can be efficiently produced at a high yield for a long period of time.

As a result, the PAS by the production process or production apparatus of the PAS according to the present invention is suitable for use in general melt processing processes such as extrusion, injection molding and compression molding, can be suitably utilized in a wide variety of fields such as electrical and electronic equipments and automotive equipments, including sealing compounds and covering materials for electronic parts, and is high in industrial applicability.

REFERENCE SIGNS LIST

1 Tower top portion
2 Body portion
3 Tower bottom portion
5 Partition plate
6 Agitating blade
7 Shaft of agitator
21-25 Stirring chambers
91 Aqueous slurry supply port
92 Washing liquid supply port
93 Polymer particle discharge port
94 Washing waste liquid discharge port

The invention claimed is:

1. A production process of a poly(arylene sulfide), comprising
a polymerization step of subjecting at least one sulfur source selected from the group consisting of alkali metal sulfides and alkali metal hydrosulfides and a dihalo-aromatic compound to a polymerization reaction in an organic amide solvent to form a poly(arylene sulfide);
a separation step of separating poly(arylene sulfide) particles from a reaction mixture containing the poly(arylene sulfide) particles;
a countercurrent washing step comprising washing the separated poly(arylene sulfide) particles with at least one washing liquid selected from the group consisting of water, an organic solvent and a mixed solution of water and an organic solvent in a washing tower composed of a tower top portion, a body portion and a tower bottom portion,
wherein a poly(arylene sulfide) particle-containing aqueous slurry is introduced from an aqueous slurry supply port and caused to proceed downward in the washing tower, the washing liquid is introduced to the tower bottom portion and caused to proceed upward to continuously bring the washing liquid into countercurrent contact with the aqueous slurry in the body portion, thereby conducting countercurrent washing, the poly(arylene sulfide) particles are discharged from a polymer particle discharge port in the tower bottom portion, and a washing waste liquid is discharged from a washing waste liquid discharge port in the tower top portion,
wherein the body portion is divided into stirring chambers and the respective stirring chambers are mutually partitioned by partitioning plates, each plate having a center opening, wherein an agitating blade is arranged in each of the stirring chambers and the agitating blade is rotationally fixed to a common agitator shaft extending through the tower top portion and the body portion and is rotated in the stirring chamber, and
wherein the tower top portion has a flow path area sufficiently enlarged relative to the body portion such that the poly(arylene sulfide) particle-containing aqueous slurry introduced from the aqueous slurry supply port avoids axial backmixing by a liquid current discharged from the washing waste liquid discharge port;
a poly(arylene sulfide) particle re-separation step comprising supplying the washing waste liquid discharged from the washing waste liquid discharge port to a poly(arylene sulfide) particle re-separating unit including a micro-slit filter having slits of a size within a range of 30 to 200 μm, wherein the micro-slit filter captures poly(arylene sulfide) particles from the washing waste liquid, and then re-separating the captured poly(arylene sulfide) particles from the micro-slit filter by a periodic backwashing operation;
a collecting step of collecting the poly(arylene sulfide) particles separated from the micro-slit filter; and
a collecting step of collecting poly(arylene sulfide) particles discharged from the polymer particle discharge port.

2. The production process of the poly(arylene sulfide) according to claim 1, wherein the countercurrent washing step is conducted plural times.

3. The production process of the poly(arylene sulfide) according to claim 1, wherein the poly(arylene sulfide) particle-containing aqueous slurry contains an acidic compound.

4. The production process of the poly(arylene sulfide) according to claim 1, wherein the polymerization step is a step of subjecting at least one sulfur source selected from the group consisting of the alkali metal sulfides and the alkali metal hydrosulfides and the dihalo-aromatic compound to a polymerization reaction at a temperature of 170 to 290° C. in the presence of a phase separation agent in the organic amide solvent.

5. The production process of the poly(arylene sulfide) according to claim 1, wherein the polymerization step is a step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent, causing the phase separation agent to exist in a polymerization reaction system at the time a conversion of the dihalo-aromatic compound has reached at least 30% and continuing the polymerization reaction at a temperature of 245 to 290° C.

6. The production process of the poly(arylene sulfide) according to claim 1, wherein the polymerization step is at least two-stage polymerization steps comprising a first-stage polymerization step of subjecting at least one sulfur source selected from the group consisting of the alkali metal sulfides and the alkali metal hydrosulfides and the dihalo-aromatic compound to a polymerization reaction in the organic amide solvent to form a polymer in which a conversion of the dihalo-aromatic compound is 80 to 99%; and
a second-stage polymerization step of continuing the polymerization reaction in the presence of the phase separation agent in a phase-separated state that a concentrated formed polymer phase and a dilute formed polymer phase are present in a mixed state within the polymerization reaction system.

7. The production process of the poly(arylene sulfide) according to claim 1, wherein the polymerization step is at least two-stage polymerization steps comprising a first-stage polymerization step of subjecting at least one sulfur source selected from the group consisting of the alkali metal sulfides and the alkali metal hydrosulfides and the dihalo-aromatic compound to a polymerization reaction at a temperature of 170 to 270° C. in the organic amide solvent in a state that water is present in a proportion of 0.02 to 2.0 mol per mol of a charged sulfur source, thereby forming a polymer in which a conversion of the dihalo-aromatic compound is 80 to 99%; and     a second-stage polymerization step of controlling the amount of water in the polymerization reaction system so as to bring about a state that water exists in a proportion of from higher than 2.0 mol to not higher than 10 mol per mol of the charged sulfur source, and continuing the polymerization reaction at a temperature of 245 to 290° C. in a phase-separated state that a concentrated formed polymer phase and a dilute formed polymer phase are present in a mixed state within the polymerization reaction system.

8. The production process of the poly(arylene sulfide) according to claim 6, wherein in the second-stage polymerization step, the amount of water in the polymerization reaction system is controlled so as to bring about a state that water exists in a proportion of from higher than 2.0 mol to not higher than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of 0.01 to 3 mol per mol of the charged sulfur source.

9. The production process of the poly(arylene sulfide) according to claim 1, wherein prior to the polymerization step, are arranged     a dehydration step of heating and reacting a mixture containing the organic amide solvent, the sulfur source containing the alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system; and     a charging step of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of the charged sulfur source, and the number of moles of water becomes 0.02 to 2.0 mol per mol of the charged sulfur source.

10. The production process of the poly(arylene sulfide) according to claim 1, wherein the phase separation agent is added prior to the separation step.

11. The production process of the poly(arylene sulfide) according to claim 4, wherein the phase separation agent is at least one selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons.

12. The production process of the poly(arylene sulfide) according to claim 11, wherein the phase separation agent is composed of water and the organic carboxylic acid metal salt in proportions of 0.5 to 10 mol and 0.001 to 0.7 mol, respectively, per mol of the charged sulfur source.

13. A production apparatus of a poly(arylene sulfide), comprising a polymerization device for subjecting at least one sulfur source selected from the group consisting of alkali metal sulfides and alkali metal hydrosulfides and a dihalo-aromatic compound to a polymerization reaction in an organic amide solvent to form a poly(arylene sulfide);

a separation device for separating poly(arylene sulfide) particles from a reaction mixture containing the poly (arylene sulfide) formed;

a countercurrent washing tower composed of a tower top portion, a body portion and a tower bottom portion for washing the poly(arylene sulfide) particles separated with at least one washing liquid selected from the group consisting of water, an organic solvent and a mixed solution of water and an organic solvent, wherein a poly(arylene sulfide) particle-containing aqueous slurry is caused to proceed downward in the washing tower, the washing liquid is caused to proceed upward to continuously bring the washing liquid into countercurrent contact with the aqueous slurry, thereby conducting countercurrent washing, the poly(arylene sulfide) particles are discharged from the tower bottom portion, and a washing waste liquid is discharged from the tower top portion at a washing waste liquid discharge port, wherein the tower top portion has a flow path area sufficiently enlarged relative to the body portion such that the poly(arylene sulfide) particle-containing aqueous slurry introduced from an aqueous slurry supply port avoids axial backmixing by a liquid current discharged from the washing waste liquid discharge port;

a poly(arylene sulfide) particle re-separating device having a poly(arylene sulfide) particle capturing unit equipped with a micro-slit filter, to which the washing waste liquid discharged from the washing tower is supplied to capture poly(arylene sulfide) particles, and a backwashing unit for re-separating the poly(arylene sulfide) particles from the micro-slit filter to discharge them; and     a collecting device for collecting the poly(arylene sulfide) particles discharged.

14. The production apparatus of the poly(arylene sulfide) according to claim 13, wherein the countercurrent washing tower and the poly(arylene sulfide) particle re-separating device are respectively provided more than one device.

15. The production process of the poly(arylene sulfide) according to claim 1, wherein the micro-slit filter has slits of a size within a range of 40 to 120 μm.

16. The production process of the poly(arylene sulfide) according to claim 1, wherein the micro-slit filter has slits of a size within a range of 45 to 100 μm.

\* \* \* \* \*